US006423108B1

(12) United States Patent
Mueller

(10) Patent No.: US 6,423,108 B1
(45) Date of Patent: Jul. 23, 2002

(54) AIR FILTER FOR AN INTERNAL COMBUSTION ENGINE

(75) Inventor: Heinz Mueller, Remseck (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/646,708

(22) PCT Filed: Feb. 20, 1999

(86) PCT No.: PCT/EP99/01116

§ 371 (c)(1), (2), (4) Date: Sep. 21, 2000

(87) PCT Pub. No.: WO99/49205

PCT Pub. Date: Sep. 30, 1999

(30) Foreign Application Priority Data

Mar. 21, 1998 (DE) ........................................ 198 12 566

(51) Int. Cl.[7] ........................ B01D 35/30; B01D 35/147

(52) U.S. Cl. .......................... 55/385.3; 55/419; 55/420; 96/399; 96/407; 123/198 E

(58) Field of Search ....................... 55/419, 420, 385.3, 55/306, 497, 500; 96/399, 407; 123/198 E

(56) References Cited

U.S. PATENT DOCUMENTS 5,174,258 A * 12/1992 Tanaka ................... 123/198 E
5,526,777 A * 6/1996 Taomo et al. ........... 123/198 E

FOREIGN PATENT DOCUMENTS

DE 2709004 A * 9/1978
DE 19737545 A1 * 3/1999
JP 57108453 A * 7/1992 ............. 123/198 E

* cited by examiner

*Primary Examiner*—Robert A. Hopkins
(74) *Attorney, Agent, or Firm*—Crowell & Moring LLP

(57) ABSTRACT

An air filter for an internal combustion engine having a housing (10) and a filter element (11) which is arranged in the housing. The housing (10) is provided with a filtered air outlet (15) and at least one untreated air inlet (16) with a screen (17) or a closable flap. An auxiliary untreated air inlet (18) which is closed by a flap valve (19) is also provided. The screen (17) or the flap of the untreated air inlet (16) opens when the temperature of the untreated air is above a certain threshold value and closes when the temperature of the untreated air is below a certain threshold value.

10 Claims, 1 Drawing Sheet

AIR FILTER FOR AN INTERNAL COMBUSTION ENGINE

BACKGROUND OF THE INVENTION

The invention relates to an air filter for an internal combustion engine.

In internal combustion engines for motor vehicles the raw air inlet is usually arranged in an area into which cold air can enter unhampered. The air inlet is therefore normally situated behind the radiator grille of the vehicle or in the area of a fender. It has been found that, in especially cold countries, when travel is encumbered by heavy snowfall and swirling snow, snow is drawn in with the raw air, and this snow is deposited on the filter insert and, under certain circumstances, clogs the filter insert. This causes the motor to stall.

It is furthermore disadvantageous that, when the motor is turned off, the snow on the air filter insert thaws and forms an ice coating which prevents the entry of air into the motor and thus interferes with the starting of the motor.

It is therefore proposed in G 93 07 147.7 to provide an air filter for an internal combustion engine in which the raw air inlet is provided with a sieve. Furthermore, a second raw air inlet is provided, which has a flap valve, this valve opening depending on the vacuum prevailing in the filter housing. This signifies that the penetration of snow is hampered by the sieve and —in case the sieve is plugged with snow—the second flap opens and thus snow-free raw air can be drawn in. The sieve thus effectively prevents the penetration of snow. Of course, this has the consequence of a loss of performance, since a certain portion of the raw air inlet has its cross section reduced by the sieve structure. It was therefore attempted to increase the mesh width of the sieve. However, this enables flying snow to penetrate and the disadvantages described above occur, such as the clogging of the filter insert.

Of course, it is also possible to make the raw air inlet cross section larger. Even this entails disadvantages, including among other things, the result that more intake air noise is generated.

SUMMARY OF THE INVENTION

It is therefore the object of the invention to provide an air filter for an internal combustion engine, which will assure optimum separation of snow and also will not reduce the cross-sectional area of the raw air inlet to any substantial extent, if at all.

This object is achieved.

The advantage of the invention is that the sieve closing the raw air inlet or the closed flap opens or closes depending on the raw air temperature. The performance of the movement can be controlled, for example, by a wax thermostat. Thus, at a temperature above a certain value, the full cross section of the raw air opening remains available. The internal combustion engine can develop its maximum power. Below the temperature limit, i.e., for example at a temperature of less than +2° C., the sieve or the flap closes the raw air inlet and thus prevents entry of snow.

In accordance with one embodiment of the invention, the additional raw air inlet is provided with a weight-loaded or spring-loaded flap. The closing force is established such that the valve opens only at a vacuum which is formed when the sieve is clogged with snow or the flap has closed due to the temperature of the raw air opening.

An additional embodiment of the invention provides for arranging the additional raw air inlet in the area of a snow-free zone of the motor compartment. For example, this can be in back of the air cooler. It is also possible to arrange this raw air inlet near the exhaust manifold, in order thereby to take in heated air.

In order to open the raw air inlet provided with the sieve or the flap, different actuating means can be provided. It is possible to sense the vacuum in the raw air part of the air filter and generate a control signal which activates an actuator in accordance with the sensed vacuum. It is also possible to provide a simple expansion thermostat which at a certain temperature turns the sieve or the flap to the appropriate position. Additional possibilities for turning the sieve or flap are magnetic drivers or electric drivers.

These and additional features of preferred embodiments of the invention will be found not only in the claims but also in the description and the drawings, the individual features being applicable individually or severally in the form of subcombinations in the embodiment of the invention and in other fields and may represent advantageous as well as independently patentable embodiments, for which protection is hereby claimed.

BRIEF DESCRIPTION OF THE DRAWINGS

The invention will be explained in further detail below with reference to working embodiments.

DETAILED DESCRIPTION OF PREFERRED EMBODIMENTS

Figure 1:
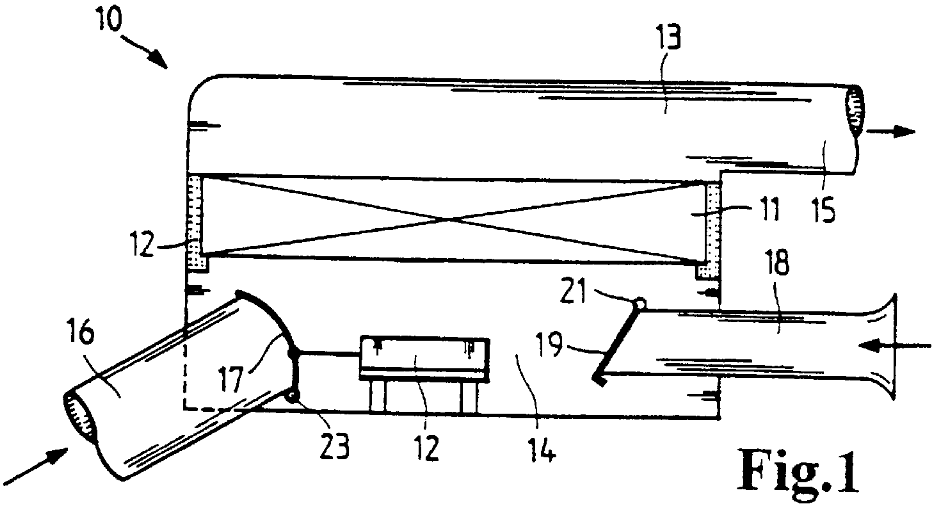
FIG. 1 shows an air filter with an anti-snow system.

An air filter according to FIG. 1 has an air filter housing 10. In this housing an air filter insert 11 is arranged, which is comprised, for example, of a pleated filter paper which is provided with a circumferential gasket 12 and is arranged with the gasket in a receptacle of the filter housing 10. The filter insert 11 separates a clean air space 13 from a raw air space 14. The clean air space 13 is provided with a connecting nipple 15. Through this connecting nipple 15 the cleaned air flows to an internal combustion engine, not illustrated here. Within the raw air space 14 is a first intake tube 16 through which the cold air is supplied to the filter system. The intake tube 16 is provided at its open end facing the raw air space with a basket sieve 17. This basket sieve 17 has a sieve with a mesh width established by experiment, and serves to effectively entrap snow and ice crystals. If this basket sieve is impinged upon by a large amount of snow, it is unavoidably closed. The intake of air through this intake tube 16 is therefore no longer possible. Intake is impossible also if the pivotable sieve basket is constructed by means of a closed flap.

Therefore an additional intake tube 18 is provided. The inlet of this intake tube is arranged at a location within a vehicle's motor compartment that is snow-free. This can be, for example, near the exhaust manifold or directly in back of the radiator housing, but if it is in back of the radiator housing care must be taken that this inlet surface is at right angles to the radiator surface or that its mouth is behind the motor in the direction of travel.

This additional intake tube is closed by a flap valve 19 at its inner opening facing the raw air space. The flap 19 can either be spring-loaded or alternatively weight-loaded. In the drawing, this valve is configured as a weight-loaded flap and is mounted on a hinge 21 so it can piviot. In the case of a spring-loaded flap, the spring is located in the hinge 21.

As soon as the basket sieve 17 is clogged by snow or snow crystals or the flap is closed due to the outside air temperature, a vacuum is produced by the running internal combustion engine in the clean air side of the intake manifold, which carries over to the raw air side or raw air chamber 14. This vacuum causes the flap 19 to open, so that combustion air can flow in through the additional intake tube 18. To the extent that this combustion air is heated, this heating produces the thawing of the snow collected in the basket sieve and thus frees the intake tube 16, so that then fresh air can again be drawn in through the intake tube 16. Thus the vacuum in the raw air space decreases and the flap 19 closes again. The weight of the flap, or the spring force in the case of a spring-loaded flap, is selected such that the vacuum that is necessary for the opening of the flap does not increase beyond a certain allowable level.

If the temperature of the aspirated raw air rises above a level at which the penetration of snow is unlikely, i.e., at 4° C., for example, a wax thermostat 22 opens the basket sieve 17 or the flap. The basket sieve 17 or the flap is attached by a hinge 23 to the intake tube 16. Thus, beginning at this temperature limit the full cross section is available for the passage of the intake air or raw air, so that no losses of performance of the internal combustion engine need be feared. Only at a temperature below the temperature limit does the wax thermostat 22 close the intake tube with the basket sieve 17 or the flap and thus effectively prevents the entry of snow.

Figure 2:
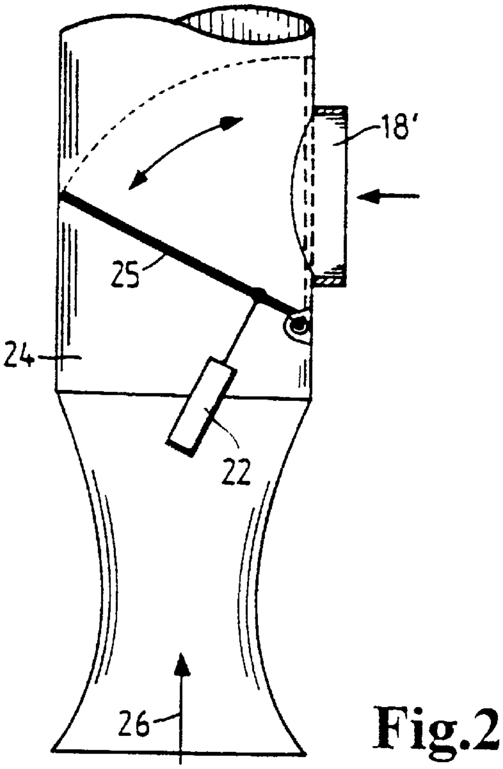
FIG. 2 shows a variant of an air filter.

FIG. 2 shows a variant of an air filter with an anti-snow system. Here only the air intake tract 24 of an air filter for an internal combustion engine is illustrated. In this intake tract there is a mesh plate 25 or flap which also can be operated by a wax thermostat 22. Below a temperature limit of 2° C., for example, the mesh plate 25 or the valve is in the illustrated position, which means that if snow enters through the opening 26, it is trapped by the mesh plate 25. At the same time an opening 18', i.e., the additional intake tube, is opened so that snow-free air can flow in.

If the intake temperature exceeds the limit, then the mesh plate is moved by the wax thermostat to the position indicated by broken lines and closes the additional intake tube 18 and opens up the full cross section for the raw air.

Figure 3:
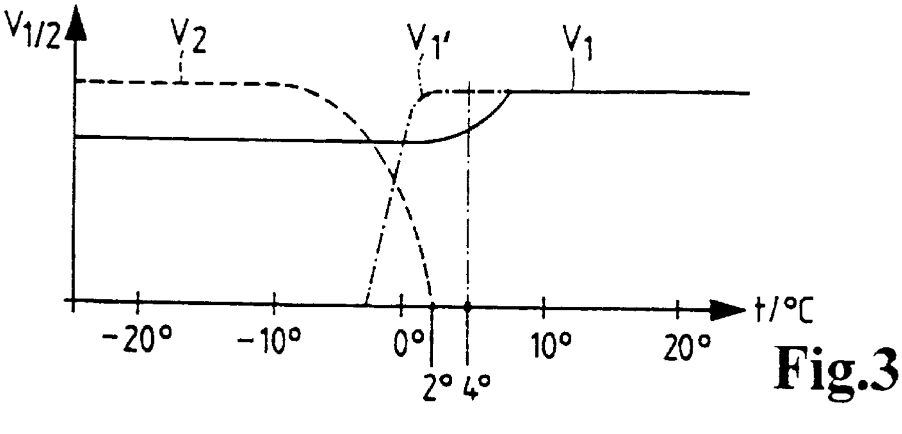
FIG. 3 shows a diagram of the volumetric flow of the intake air supplied to an internal combustion engine.

FIG. 3 shows the different volumetric flows which establish themselves especially in a device according to FIG. 1. Volumetric flow V1' is the raw air flow through the intake tube 16 in the case of a flap valve, and volumetric flow V1 in the case of a basket sieve 17. Above a temperature limit of 2° C., the full cross-sectional area V1' is available; below this temperature limit, the basket sieve or the flap closes the intake tube 16 and thus reduces the maximum volumetric flow. Simultaneously, however, in case of an increase of the vacuum in the raw air space 14 of the air filter, the flap valve 19 opens so that an additional volumetric flow V2 can flow into the raw air space.

The internal combustion engine thus has sufficient intake air available in every operating condition, so that both at higher temperatures and also at lower temperatures it can achieve its maximum power.

What is claimed is:

1. An air filter for an internal combustion engine, said filter comprising a housing, a filter insert arranged in the housing, a clean-air outlet opening out from said housing, and a raw air inlet opening into said housing, a snow blocking element associated with said raw air inlet which prevents snow from passing through said inlet into the filter housing, an auxiliary air inlet opening into said housing, wherein the snow blocking element is movable between an open position in which the raw air inlet is unblocked and a blocking position in which snow is blocked from passing through said raw air inlet; wherein said snow blocking member is moved between said open position and said blocking position depending on the temperature of raw air drawn into the filter housing, and wherein said snow blocking element is a screen or sieve having a mesh width small enough to prevent passage of snow therethrough.

2. An air filter according to claim 1, wherein said snow blocking element is a flap valve which closes the raw air inlet.

3. An air filter according to claim 1, further comprising a flap valve which closes the auxiliary air inlet.

4. An air filter according to claim 3, wherein the flap valve which closes the auxiliary air inlet is spring-loaded to a closed position.

5. An air filter according to claim 3, wherein the flap valve which closes the auxiliary air inlet is weight-loaded to a closed position.

6. An air filter according to claim 1, wherein said auxiliary air inlet opens from a snow-free zone of a motor compartment.

7. An air filter according to claim 1, wherein said snow blocking element is moved by an expansion-material thermostat.

8. An air filter according to claim 7, wherein said thermostat is a wax thermostat.

9. An air filter according to claim 1, wherein said snow blocking element in the open position, blocks said auxiliary air inlet.

10. An air filter for an internal combustion engine, said filter comprising a housing, a filter insert arranged in the housing, a clean-air outlet opening out from said housing, and a raw air inlet opening into said housing, a snow blocking element associated with said raw air inlet which prevents snow from passing through said inlet into the filter housing, an auxiliary air inlet opening into said housing, wherein the snow blocking element is movable between an open position in which the raw air inlet is unblocked and a blocking position in which snow is blocked from passing through said raw air inlet; wherein said snow blocking member is moved between said open position and said blocking position depending on the temperature of raw air drawn into the filter housing, and wherein said snow blocking element is moved by an electrically or magnetically operated actuator.

* * * * *